ROLLING MILL CONTROL SYSTEM

Original Filed April 22, 1968 3 Sheets-Sheet 1

INVENTORS
SAMUEL S. HARBAUGH,
JOSEPH J. KASECKY and
JAMES B. MURTLAND, JR.
By Murray & Linkhauer
Attorneys

ROLLING MILL CONTROL SYSTEM

Original Filed April 22, 1968 3 Sheets-Sheet 2

INVENTORS.
SAMUEL S. HARBAUGH,
JOSEPH J. KASECKY and
JAMES B. MURTLAND, JR.
By Murray & Linthauer
Attorneys

ROLLING MILL CONTROL SYSTEM

Original Filed April 22, 1968 3 Sheets-Sheet 3

INVENTORS.
SAMUEL S. HARBAUGH,
JOSEPH J. KASECKY and
JAMES B. MURTLAND, JR.
By Murray & Kirkhauer
Attorneys United States Patent Office Re. 28,149
Reissued Sept. 3, 1974

28,149

ROLLING MILL CONTROL SYSTEM

Samuel S. Harbaugh, Joseph J. Kasecky, and James B. Murtland, Jr., Natrona Heights, Pa., by Allegheny Ludlum Industries, Inc., Pittsburgh, Pa., assignee Original No. 3,564,882, dated Feb. 23, 1971, Ser. No. 723,121, Apr. 22, 1968. Application for reissue Oct. 1, 1973, Ser. No. 402,510
Int. Cl. B21b *37/00*
U.S. Cl. 72—8 13 Claims

Matter enclosed in heavy brackets [ ] appears in the original patent but forms no part of this reissue specification; matter printed in italics indicates the additions made by reissue.

ABSTRACT OF THE DISCLOSURE

Described is a rolling mill control system for tandem rolling mills based on the constant volume principle and wherein anticipated or predicted exit gage is calculated from measured entry gage and the length of material entering and leaving the mill. This predicted exit gage is compared with desired exit gage as determined by the mill operator to generate an error correction signal to the mill screwdowns if the predicted and desired gages are not the same.

BACKGROUND OF THE INVENTION

In the majority of existing control systems for rolling mills, a mill screwdown or the like is controlled from a gage measurement taken several feet beyond the exit side of the mill. In a system of this type, the material, after reduction, progresses to the gage which may be several feet beyond the bite of the mill rolls before any error present in the material thickness can be detected. This distance from the bite of the rolls to the gage is commonly referred to as "transport distance." The time required for the material to reach the exit gage is denoted as "transport time," while the time required to measure the strip exit gage is referred to as "sensing time." Transport time and sensing time are major elements in developing error commands. Transport distances of five feet or more are common in most of the commercial rolling equipment presently available, meaning that such systems are not capable of detecting an error signal until five feet of material has passed from the bite of the mill rolls. The corrective signal is then transmitted to the mill screwdown; but the measuring gage does not detect the result of this action until five feet more of the material has passed through the mill. With a high gain system of this type, a natural frequency of oscillation results; and if this oscillation is left to exist without any attempt to control it, the results are undesirable. That is, for material entering the mill with fairly noticeable changes in gage, the system described would cause wide variations in output gage that in all probability would eventually result in tearing of the strip.

In an attempt to control the natural frequency of oscillation, some designers have damped their system so as to allow only a certain portion of the corrective signal to be transmitted to the screwdown after each measurement. Other designers have provided damping in the screws in order to slow down the response to any corrective signals. In either case, the damping considerably reduces the efficiency and effectiveness of the control system. In a highly damped system, the result is a number of ensuing measurements before the material is brought within gage limits, resulting in wasted material which has progressed from the mill before the desired gage can be obtained. In present-day commercial mills, this loss is often considerable.

Systems such as those shown in U.S. Pat. Nos. 3,015,-974, 3,054,311 and 3,121,354 have been devised wherein the gage of strip material can be measured directly at the bite of the rolls, thereby eliminating the undesirable transport time and sensing time inherent in conventional feedback gage control systems. Such control systems are based on the concept that the volume, $V_1$, of material coming out of the mill must be equal to the volume, $V_2$, entering the mill. Thus:

$$V_1=V_2$$

and $$L_1W_1G_1=L_2W_2G_2$$

where:

$L_1$=length of material entering the mill;
$L_2$=length of material leaving the mill;
$G_1$=gage of material entering the mill;
$G_2$=gage of material leaving the mill;
$W_1$=width of material entering the mill; and
$W_2$=width of material leaving the mill.

In actual practice, it has been found that the width of the material remains essentially constant. Accordingly, the factors $W_1$ and $W_2$ can be eliminated from the foregoing equation resulting in:

$$L_1G_1=L_2G_2$$

In rolling mill control systems of the type described in the foregoing patents, an error signal for the rolling mill screwdown is derived by calculating the desired input gage, $\overline{G}_1$, from the length of material entering the mill, the length of material leaving the mill, and calculated desired output gage, $G_{2d}$. Calculated desired input gage is then compared with the actual measured value of input gage. That is, $$\text{Error}=G_1-\overline{G}_1=G_1-\frac{L_2G_2}{L_1}$$

While such systems are entirely satisfactory for their intended purpose, their use has generally been limited to single stand mills and, in addition, many do not provide for any monitoring of actual output gage to correct any errors in calculated gage error.

SUMMARY OF THE INVENTION

As an overall object, the present invention seeks to provide a rolling mill control system based on the constant volume principle and wherein predicted exit gage is compared with desired exit gage to derive an error signal for the rolling mill screwdown.

Another object of the invention is to provide a rolling mill control system of the type described for a tandem rolling mill wherein predicted exit gage is derived from a consideration of the actual gage of the material entering the first stand of the mill, the length of the material entering the first stand, and the length of the material leaving the last stand.

Still another object of the invention is to provide a rolling mill control system which predicts exit gage which will occur if rolling conditions remain unchanged and wherein corrective control action can be taken with no exit gage error actually occurring.

In accordance with the invention, a rolling mill control system is provided comprising means for deriving electrical signals proportional to the actual gage, $G_1$, of the material entering the mill, the length, $L_1$, of the material entering the mill over a given time interval, and the length, $L_2$, of the material leaving the mill over said given time interval. As was explained above, the invention is based on the constant volume principle represented by the equation:

$$G_1L_1=G_2L_2$$

Consequently, the exit gage can be predicted by comparing the electrical signals proportional to $G_1$, $L_1$ and $L_2$ in accordance with the equation:

$$\overline{G}_2=\frac{L_1}{L_2}G_1$$

where $\overline{G}_2$ is the predicted exit gage. This predicted exit gage $\overline{G}_2$ is then compared with the desired exit gage $G_{2d}$ as determined by the operator of the mill to derive an error signal to the rolling mill screwdown in accordance with the equation:

$$\text{Error } \overline{G}_2-G_{2d}$$

Additionally, actual output gage is measured to produce an electrical signal, $G_2$, proportional to the actual measured output gage. This signal is averaged over a relatively long time period and compared with predicted exit gage, $\overline{G}_2$, averaged over the same relatively long time. If the two are not the same, an error signal is produced which alters the output of the circuitry for computing $G_2$ until the averaged predicted exit gage matches the averaged actual output gage.

With a system of the type described herein, corrective control action to the rolling mill screwdowns can be taken with no exit gage error actually occurring. Thus, transport time and sensing time are entirely eliminated, control action being taken if the predicted exit gage calculated before the material enters the mill deviates from the desired exit gage as determined by the operator.

In a three-stand rolling mill, for example, the last stand is normally used for tempering purposes; and very little reduction is taken here. That is, almost all of the reduction in the material is taken in the first stands. Therefore, the error signal derived by comparing predicted exit gage with desired exit gage is fed to the screwdown controls for the first two stands only. In one embodiment of the invention, the screwdowns for the first two stands in a three-stand tandem mill are moved the same amount by the exit gage regulator to correct for predicted exit gage gage error. In addition, the load force readings on the first two stands are averaged over a relatively long time and compared to each other. If the average load for the first stand exceeds that for the second, then the roll gap for the first stand is increased an additional amount. On the other hand, the roll gap for the first stand is decreased if the second stand load exceeds that on the first stand. In this manner, the loads on the two stands are kept nearly equal.

In another embodiment of the invention, the screwdowns for the first two stands are moved the same amount by the exit gage regulator to correct for predicted exit gage error. In addition, the exit gage of the first stand is averaged over a relatively long time and compared to the desired value set by the operator. If this measured gage is less than desired, then the first stand roll gap is increased an additional amount. Conversely, the roll gap on the first stand is decreased if the measured gage is greater than desired. In this manner the exit gage of the first stand is kept near the desired value.

In still another embodiment of the invention, the error signal produced by comparison of calculated exit gage with desired exit gage is used to control the tension in the strip, with or without screwdown correction, which tension also regulates the gage of the issuing strip.

The above and other objects and features of the invention will become apparent from the following detailed description taken in connection with the accompanying drawings which form a part of this specification, and in which.

Figure 1:
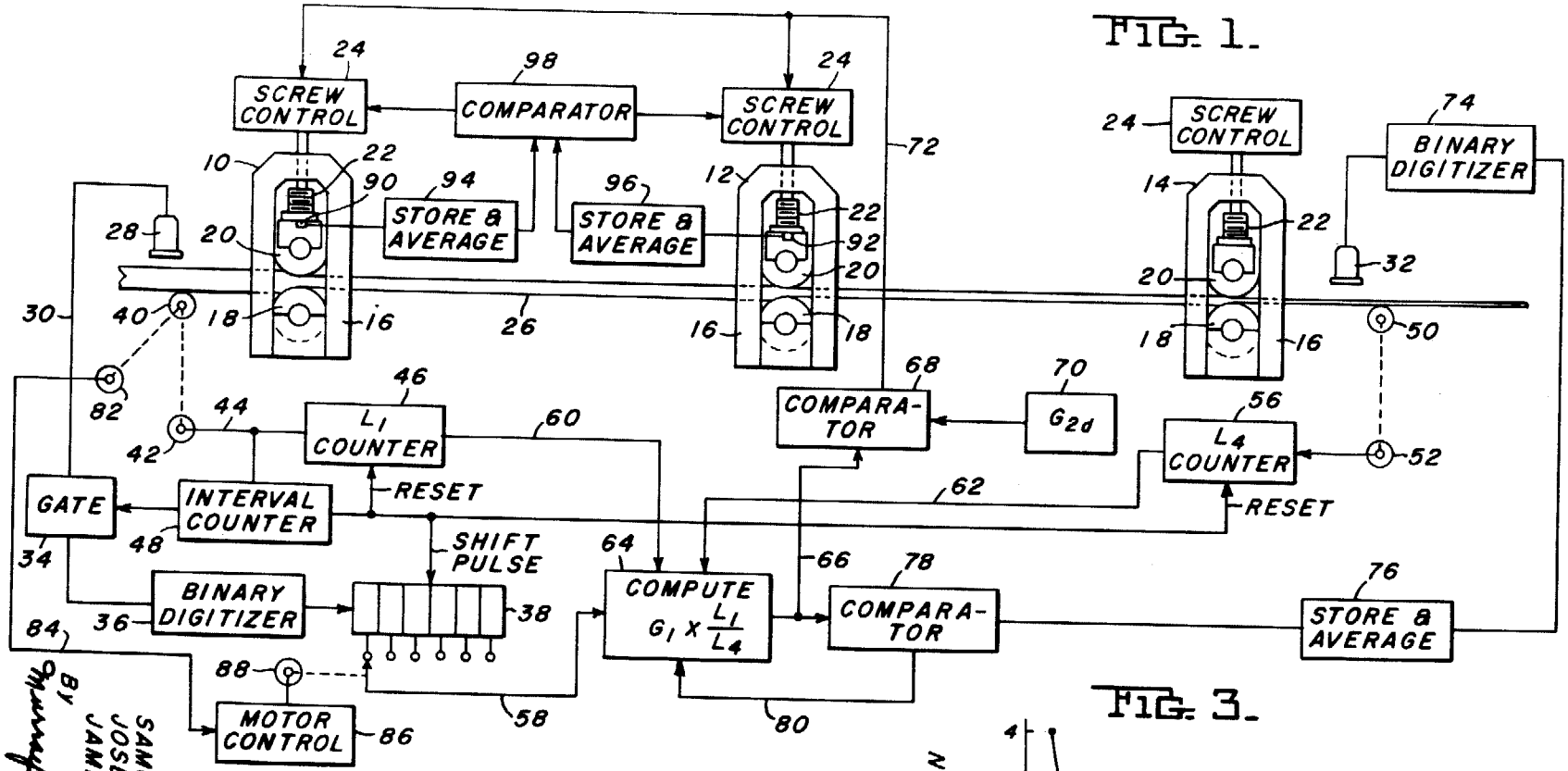
FIG. 1 is a schematic diagram of one embodiment of the invention wherein predicted exit gage is utilized to control the screws on the first two stands of a tandem rolling mill, and incorporating means including load sensitive devices under the screws for maintaining the loads on the first two stands nearly equal.

With reference now to the drawings, and particularly to FIG. 1, a tandem rolling mill is shown including three stands identified by the reference numerals 10, 12 and 14. Each stand includes an outer housing 16 which supports upper and lower rolls 18 and 20, the spacing or gap between the rolls being controlled by means of a screwdown mechanism generally indicated by the reference numeral 22. Each screwdown mechanism 22, in turn, is controlled by means of a screwdown control 24 which conventionally includes a drive motor mechanically connected to the screwdown mechanism itself, together with electrical controls for the drive motor. The material being reduced in the mill is identified by the reference numeral 26. As will be appreciated, the material is successively reduced in thickness as it passes between the rolls 18 and 20 of each stand.

At the entrance end of the mill is a first X-ray thickness gage 28 which produces an electrical signal on lead 30 proportional to the thickness of the entering strip material. In a similar manner, an X-ray gage 32 measures the thickness of the strip material as it emerges from the third or last stand 14. The signal on lead 30 is passed through a gate 34 to a binary digitizer 36 where it is converted into a plurality of ON and OFF signals representative of the measured input gage in binary notation. These ON and OFF signals are then applied to the input of a shift register or the like, identified by the reference numeral 38.

Coupled to a roll 40 which rides on the surface of the entering strip material is a pulse generator 42 which will produce output pulses on lead 44, the frequency of the output pulses being proportional to the speed of the entering strip material. These pulses are applied to an $L_1$ counter 46 as well as an interval counter 48. In a somewhat similar manner, a roll 50 riding on the surface of the strip material emerging from the last stand 14 is mechanically coupled to a second pulse generator 52 which will produce output pulses on lead 54 having a frequency proportional to the speed of the emerging strip material. These pulses are applied to an $L_4$ counter 56.

The interval counter 48 is preset to count up the number of pulses which will be produced by the generator 42 each time the entering strip material travels one foot. Consequently, each time the strip material travels through one foot, the gate 34 is opened, the $L_1$ counter 46 is reset, and the $L_4$ counter 56 is also reset. At the same time, a shift pulse from the interval counter 48 is applied to the shift register 38 to advance gage measurements stored therein to successive storage units until they reach the output.

As will be understood, the shift register 38 serves to store and advance successive actual entry gage measurements from gage 28 in synchronous correlation with the movement of strip 26. That is, each time the gate 34 is enabled by the interval counter 48, it feeds the instantaneous entry gage measurement to the binary digitizer which, in turn, feeds the information in binary form to the shift register 38 which progressively advances these instantaneous measurements from one end of the shift register to the other. The time required to advance from one end of the shift register 38 to the other is equal to the time required for the strip 26 to travel from the gage 28 to the bite of the rolls in stand 10.

Let us assume, for example, that the gage 28 is spaced six feet in front of the bite of rolls 18 and 20 for stand 10. After the strip 26 is moved one foot, the gate 34 opens and the instantaneous gage measurement, in binary form, is fed into the first storage unit of the shift register 38. After the strip has traveled another foot, the gate is again opened and the instantaneous gage measurement again fed into the shift register 38; however by this time the previous gage measurement has been advanced one unit in the shift register 38. This process continues until six feet of material has passed from the gate to the bite of the rolls; and it will be appreciated that at this time the gage measurement taken at a point which now has progressed six feet beyond the gage 28 will be directly at the bite of the rolls 18 and 20 of stand 10.

Figure 3:
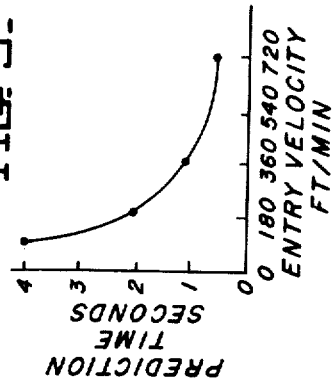
FIG. 3 is a plot of entry velocity of strip material passing through the mills of FIGS. 1 and 2 versus the prediction time of the control system shown therein.

As was explained above, the output of the binary digitizer 36 is representative of actual input gage, $G_1$, and must be used to compute predicted exit gage which is compared with desired exit gage to generate an error signal for the rolling mill screwdowns. There is, however, a certain time delay between generation of an error signal and response to that signal by the mill screwdowns. Furthermore, as the mill speed is increased, the time elapse (i.e., prediction time) between the occurrence of a gage measurement by gage 28 at a point on the strip 26 and arrival of that point at the roll bite of stand 10, decreases. This is shown in FIG. 3 where the prediction time decreases from about four seconds at a strip speed of 90 feet per minute to about 0.5 second at 720 feet per minute. That is, at 720 feet per minute it takes only one-half second for the strip to advance from entry gage 28 to the bite of the rolls of stand 10, but in all probability, the mill screwdown cannot respond in this time. It is, of course, desirable to make an error correction as quickly as possible after it is detected; and at lower speeds below about 180 feet per minute, the mill screwdown can respond well in advance of the prediction time.

Accordingly, at higher speeds, the input gage signal, $G_1$, is taken from the first unit of the shift register on lead 58. That is to say, there is no delay in the shift register. However, as the speed is decreased below 180 feet per minute, the lead 58 is connected to units farther down the shift register so that the mill, in effect, is responding to gage measurements taken closer to the bite of the rolls than six feet. Circuitry for accomplishing this will hereinafter be described in detail.

As was explained above, the interval counter 38 resets the $L_1$ counter 46 and $L_4$ counter 56 for each foot of strip travel. Consequently, the outputs of the $L_1$ counter 46 and $L_4$ counter 56 will be electrical signals indicative of the length of material which has passed into and out of the mill between successive gage measurements. These electrical signals are applied via leads 60 and 62 to a computer exit gage regulator circuit which performs the computation:

$$G_1 \times L_1 / L_4$$

this being equal to predicted exit gage, $\overline{G}_2$, as explained above.

The predicted exit gage at the output of computer circuit 64 is then applied via lead 66 to a comparator 68 where it is compared with an electrical signal proportional to desired exit gage, $G_{2d}$, from circuit 70. The value of the electrical signal, $G_{2d}$, is set by the operator. If the electrical signal on lead 66 proportional to predicted exit gage, $\overline{G}_2$, is not equal to the magnitude of the electrical signal from circuit 70 proportional to desired exit gage, $G_{2d}$, an output will be produced on lead 72 from comparator 68 which is applied to the screw control circuits 24 for stands 10 and 12, thereby causing them to move upwardly or downwardly, depending upon whether $\overline{G}_2$ is larger or smaller than $G_{2d}$. With the arrangement just described, therefore, it can be seen that the screws for stands 10 and 12 are adjusted before material being rolled ever reaches the exit gage 32; and in this manner control before the fact rather than after the fact is achieved. That is, the material need not move though the mill before an error in gage can be anticipated.

The output of the exit gage 32 is applied to a binary digitizer 74; and the output of this digitizer is applied to an averaging circuit 76 where it is stored. This stored, averaged value of exit gage is then compared with the averaged or computed predicted exit gage from computer circuit 64 in comparator 78. If the two are not the same, a signal is applied via lead 80 to the computer circuit 64 to vary its output such that actual measured exit gage and average computed exit gage are the same. It should be understood, however, that the circuitry including gage 32 and comparator 78 does not, in and of itself, control the rolling mill as in a conventional feedback system. Rather it is used only as a monitor for the computing circuit 64 to make certain that average predicted exit gage is, in fact, equal to average actual exit gage.

It was explained previously that as prediction time (FIG. 3) increases above two seconds at a strip velocity of 180 feet per minute, the shift register 38 should come into play. Connected to the roll 40 is a tachometer 82 which, through lead 84, and motor control circuit 86, causes motor 88 or some other similar device to move the movable tap on lead 58 further down the shift register 38, thereby advancing the gage measurements which are fed to the exit gage predictor.

The exit gage predictor 64 furnishes information for the screw controls 24 to take control action with the purpose of adjusting rolling conditions such that any predicted gage error will not occur. It is possible to construct a regulator which adjusts or causes to be adjusted any mill setting which will cause the exit gage to change. Since any mill setting which affects exit gage also affects other mill parameters, the manipulated settings must be chosen with consideration for possible undesirable effects on mill operations. The computer 64 effects control by varying the screwdown setting of stands 10 and 12. However, a strategy is required to determine the relative amount of screw movement between stands 10 and 12.

In FIG. 1, one arrangement is shown for determining the amount of screw movement between stands 10 and 12 which incorporates load cells 90 and 92 on the screws for stands 10 and 12. As will be understood, the output, of the load cells 90 and 92 comprises electrical signals which are proportional to the rolling forces on the respectives stands. Electrical signals proportional to roll force are averaged over a relatively long time in circuits 94 and 96 and compared with each other in comparator 98. If the average load on stand 10, for example, exceeds the average load on stand 12, then the output of the comparator 98 will be such as to actuate the screw control 24 for stand 10 to increase the gap between its rolls. On the other hand, the roll gap is decreased if the load on stand 12 exceeds that on stand 10. In this manner, the loads on stands 10 and 12 are kept nearly equal.

Figure 2:
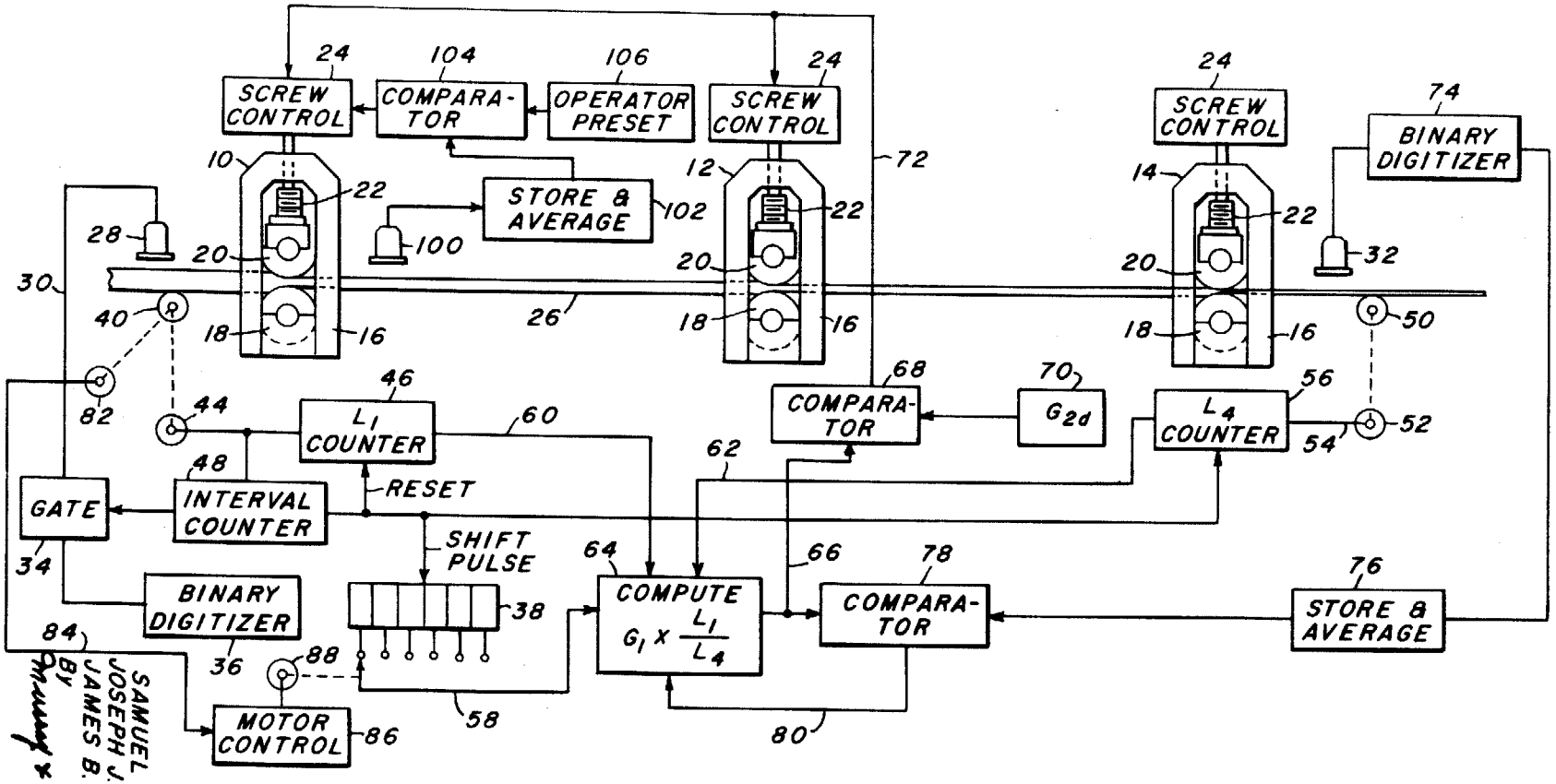
FIG. 2 is a schematic illustration of an alternative embodiment of the invention wherein the actual gage of the strip material between the first two stands is averaged over a relatively long period of time and utilized to maintain the exit gage of the first stand in a tandem rolling mill near the desired value.

In FIG. 2, an alternative embodiment of the invention is shown wherein elements corresponding to those shown in FIG. 1 are identified by like reference numerals. In this case, however, the screws for stands 10 and 12 are moved the same amount by exit gage regulator or computer 64 to correct for a predicted exit gage error. In addition, the exit gage of stand 10 as measured by X-ray gage 100 is averaged over a relatively long time in circuit 102 and compared in comparator 104 with a signal from circuit 106 proportional to the manual setting of the desired exit gage for stand 10 as determined by the operator. If the thickness as measured by gage 100 is less than desired, then stand 10 roll gap is increased an additional amount by screw control 24. On the other hand, the roll gap is decreased if the measured gage is greater than desired. In this manner, the exit gage from stand 10 is kept near the desired value.

In addition to exit gage regulation such as that illustrated in FIGS. 1 and 2, the screw on the third stand 14 can be adjusted to maintain the roll force on this stand at an operator's desired value for the purpose of maintaining the roll bending and thus the steel shape more constant. Furthermore, in addition to manipulating the first two stands 10 and 12, the exit gage regulator or computer 64 can manipulate steel tension through a tension regulator reference to effect exit gage regulation.

Figure 4:
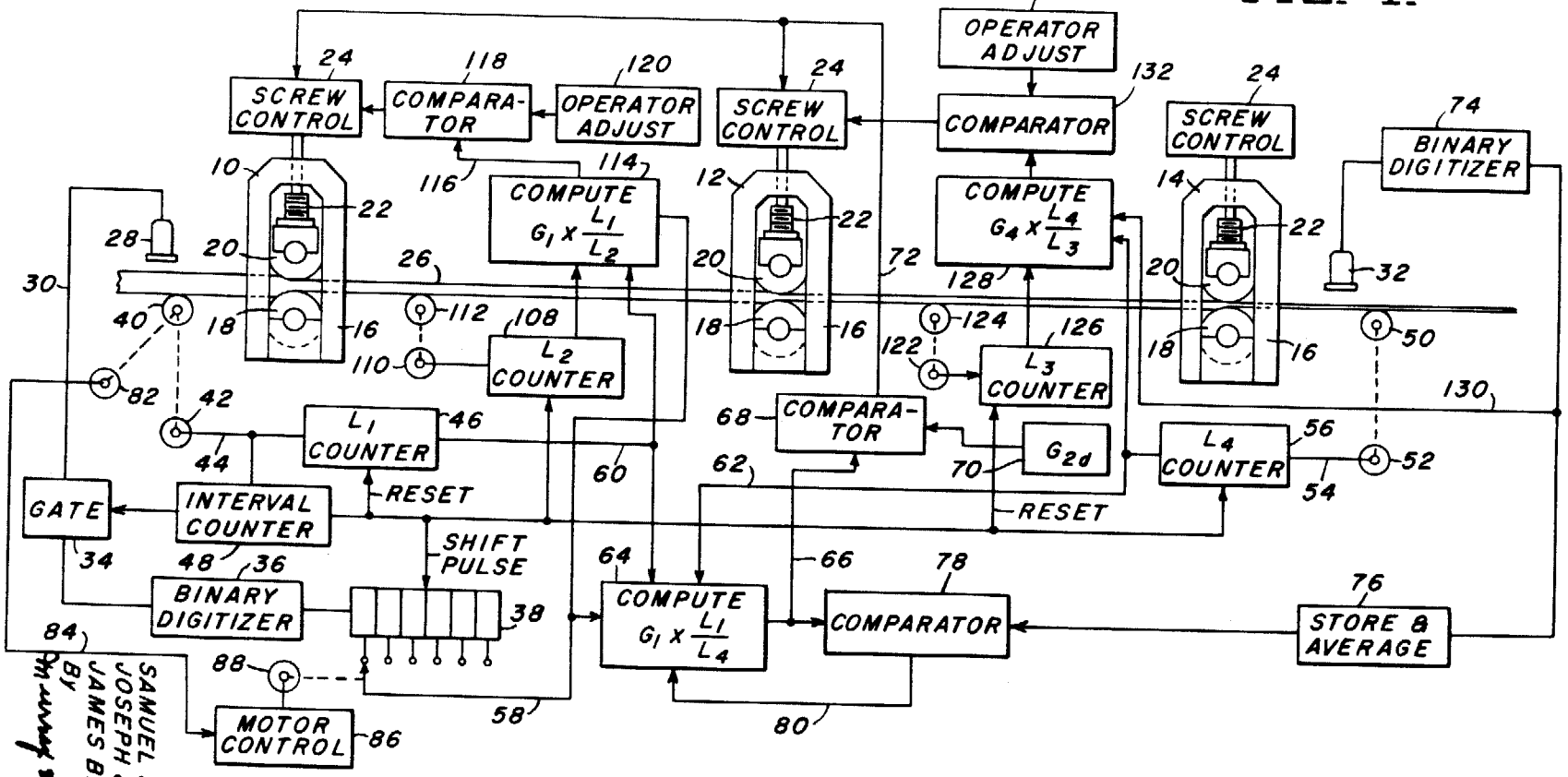
FIG. 4 illustrates other possible control schemes embodying the principles of the invention.

Other possible control schemes are shown in FIG. 4. The basic system shown in FIG. 4 is the same as that of FIGS. 1 and 2 and, accordingly, elements in FIG. 4 which correspond to identical elements in FIGS. 1 and 2 are identified by like reference numerals. The system of FIG. 4, however, incorporates additional control features. Thus, the length, $L_2$, of the material leaving the first stand 10 can be determined by means of an $L_2$ counter 108 having its input connected to a pulse generator 110 which is, in turn, connected to a roll 112 on the exit side of the stand 10. The $L_2$ counter 108 is reset, along with counters 46 and 56, after each foot of strip travel. Its output is applied to an exit gage predictor or computer 114. Also applied to the predictor 114 is the output of $L_1$ counter 46 and the entry gage measurement from gage 28.

The computer 114 computes the quantity:

$$G_1 \times \frac{L_1}{L_2}$$

This factor represents the predicted exit gage at the output of the first stand 10 in accordance with the explanation given above. The predicted exit gage from stand 10 is then applied via lead 116 to a comparator 118 where it is compared with a gage value for the first stand determined by an operator adjust circuit 120. It will be appreciated that with the arrangement shown, the gage 100 between the first two stands can be eliminated; and the first stand gage is controlled independently in much the same manner as the entire tandem rolling mill is controlled.

Likewise, the gage at the output of the second stand 12 can be determined in accordance with the constant volume principle:

$$G_3 = G_4 \frac{L_4}{L_3}$$

In an arrangement of this type, a pulse generator 122 is connected to a roll 124 between stands 12 and 14. The output of this pulse generator 122 is then applied to an $L_3$ counter 126 which, like counters 46 and 56, is reset by the interval counter 48 for each foot of strip travel. The output of the $L_3$ counter 126 is applied to computer 128 along with the electrical signal on lead 62 proportional to $L_4$ and the gage measurements on lead 130 from exit gage 32. The output of the computer 128, therefore, will be proportional to the desired gage at the output of stand 12. In this case, however, the gage is not predicted but is rather calculated after the material has passed through the stand. The output of the computer 128 is then compared in comparator 132 with a preset value established by an operator adjust circuit 134; and if the two are not the same an error signal is fed to the screw control 24 for stand 12 to raise or lower the rolls, as the case may be.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a system for controlling a rolling mill gage varying device in accordance with the principle of constant volume of material entering and leaving the mill by comparison of calculated exit gage with desired exit gage; the combination of means including electrical computer apparatus for deriving calculated exit gage by comparison of actual input length of material entering the mill, actual output length of material leaving the mill and actual measured gage of material entering the mill, [and] means coupled to said computer apparatus for comparing an electrical signal proportional to the exit gage calculated by the computer apparatus with an electrical signal proportional to desired output gage as determined by the mill operator to derive an error signal for said gage varying device [.] , *means for measuring the actual exit gage of material leaving the mill, means for comparing the measured actual exit gage with calculated exit gage, and means connecting said comparing means to said computer apparatus for varying the output of the computer apparatus when calculated exit gage and actual exit gage are not the same.*

2. The system of claim 1 wherein the gage varying device comprises means for varying the roll force exerted by the rolls of said rolling mill.

3. The system of claim 1 wherein the gage varying device comprises means for varying the tension in material passing through the mill.

4. The system of claim 1 wherein the mill includes a plurality of tandem stands, the actual input length of material entering the mill is that entering the first stand, and the actual output length of material leaving the mill is that leaving the last stand.

[5. The system of claim 1 including means for measuring the actual exit gage of material leaving the mill, means for comparing the measured actual exit gage with calculated exit gage, and means connecting said comparing means to said computer apparatus for varying the output of the computer apparatus when calculated exit gage and actual exit gage are not the same.]

6. In a system for controlling the exit gage of material passing through a plurality of tandem rolling mill stands; the combination of means for producing a first electrical signal proportional to a calculated gage of material passing through the mill from a consideration of an actual gage measurement of material passing through the mill and the actual lengths of material entering and leaving the mill over a predetermined period of time, means for comparing said first electrical signal with a second electrical signal to derive an error signal, said second electrical signal being a function of the desired output gage of material leaving the mill as determined by the mill operator, screwdown mechanisms for said tandem stands, and means responsive to said error signal for controlling the screwdown mechanisms on stands preceding the last stand only.

7. The system of claim 6 wherein there are at least three tandem stands in the mill, and wherein the error signal is utilized to control screwdown mechanisms on the first two stands only.

8. The system of claim 7 including means for measuring the roll forces on said first two stands, means for comparing the measured roll forces, and means coupled to said last-mentioned comparing means for actuating the screwdown on at least one of said first two stands when the measured roll forces are not the same.

9. The system of claim 8 wherein the screwdown on only the first stand is actuated, the screwdown acting to increast the roll gap between the rolls for the first stand when the measured roll force for the first stand is less than that for the second stand, said screwdown acting to decrease the roll gap between the rolls for the first stand when the measured roll force for the first stand is less than that for the second stand.

10. The system of claim 7 including means for measuring the actual gage of material passing between the first two stands, means for comparing said measured gage between the first two stands with the gage setting for the rolls on the first stand, and means for actuating the screwdown for said first stand when the measured gage between the first two stands is not the same as said gage setting.

11. In an electrical control system for a rolling mill screwdown based on the principle of constant volume of material entering and leaving the mill and wherein an electrical signal proportional to desired exit gage as determined by a mill operator is compared with an electrical signal proportional to calculated exit gage represented by $$G_1\frac{L_1}{L_2}$$

where $G_1$ is the actual gage of the material entering the mill, $L_2$ is the actual length of the material leaving the mill for a given volume entering the mill, and $L_1$ is the actual length of the material entering the mill for said given volume; the combination of a gage measuring device for deriving [an] *a digital* electrical signal which varies as a function of $G_1$, means for producing [and] *a digital* electrical signal which varies as a function of $L_1$, means for producing [an] *a digital* electrical signal which varies as a function of $L_2$, [and] *digital computer* means responsive to the electrical signals proportional to $G_1$, $L_1$ and $L_2$ for computing calculated exit gage [.] *, means for measuring the actual exit gage $G_2$ of material leaving the mill, means for comparing the measured actual exit gage $G_2$ with calculated exit gage, and means connecting said comparing means to said computer means to vary the output of the computer means when calculated exit gage and actual exit gage are not the same.*

12. The control system of claim 11 wherein the means for producing electrical signals proportional to $L_1$ and $L_2$ includes a first pulse generator for generating a number of pulses proportional to $L_1$, a second pulse generator for generating a number of pulses proportional to $L_2$, a first counter for counting the pulses from said first pulse generator, a second counter for counting the pulses from the second pulse generator, and means for resetting said counters simultaneously each time material passing through said mill has moved through a predetermined distance.

13. The control system of claim 11 wherein said rolling mill includes a plurality of tandem stands and including means for measuring actual output gage from the first stand of the mill, and means for comparing said actual measured gage at the output of the stand with the gage setting for that stand as determined by the mill operator to derive an error signal for controlling the screwdown for said first stand.

14. The electrical control system of claim 11 wherein said rolling mill includes a plurality of tandem stands, means for measuring the roll forces on the first two stands in said plurality of stands, means for comparing said roll forces on the first two stands, and means coupled to said comparing means for controlling the screwdowns for said first two stands.

References Cited

The following references, cited by the Examiner, are of record in the patented file of this patent or the original patent.

UNITED STATES PATENTS

| | | | |
|---|---|---|---|
| Re. 25,075 | 10/1961 | Hessenberg | 72—9 |
| 3,015,974 | 1/1962 | Orbom et al. | 72—9 |
| 3,054,311 | 9/1962 | Murtland et al. | 72—205 X |
| 3,121,354 | 2/1964 | Wermeychik et al. | 72—9 |
| 3,169,424 | 2/1965 | Branscom et al. | 72—9 |
| 3,387,471 | 6/1968 | Freedman | 72—9 |
| 3,394,567 | 7/1968 | Kasecky et al. | 72—9 |
| 3,049,036 | 8/1962 | Wallace et al. | 72—9 |
| 3,332,263 | 7/1967 | Beadle et al. | 72—7 |
| 3,357,217 | 12/1967 | Wallace et al. | 72—8 |

FOREIGN PATENTS

| | | |
|---|---|---|
| 240,482 | 5/1965 | Austria. |
| 1,118,866 | 6/1962 | Germany. |

MILTON S. MEHR, Primary Examiner